United States Patent [19]

Stencel

[11] 4,383,353
[45] May 17, 1983

[54] PROCESS OF FORMING A JOINT WITH A PREDETERMINED CLAMP-UP LOAD

[75] Inventor: Edgar L. Stencel, Huntington Beach, Calif.

[73] Assignee: VSI Corporation, Pasadena, Calif.

[21] Appl. No.: 205,605

[22] Filed: Nov. 10, 1980

Related U.S. Application Data

[62] Division of Ser. No. 849,756, Nov. 9, 1977, Pat. No. 4,260,005.

[51] Int. Cl.³ .................. B21D 39/00; B23P 11/00
[52] U.S. Cl. ................................ 29/517; 29/526 R; 29/240; 403/284; 81/121 R
[58] Field of Search ............... 29/517, 240, 526 R, 29/520, 446, 437; 411/1, 2, 361, 281–283; 403/284; 81/121 R

[56] References Cited

U.S. PATENT DOCUMENTS

| | | | |
|---|---|---|---|
| 930,450 | 8/1909 | Zinow | 411/277 |
| 2,596,885 | 5/1952 | Booth | 29/517 UX |
| 2,897,867 | 8/1959 | Torre | 411/281 |
| 2,923,339 | 2/1960 | Skidmore | 411/277 |
| 3,464,306 | 9/1969 | Reynolds | 411/361 |
| 3,603,132 | 9/1971 | Holmes | 29/517 X |
| 3,763,725 | 10/1973 | Reiland | 411/2 X |
| 3,920,338 | 11/1975 | Dahl | 403/284 X |
| 4,005,740 | 2/1977 | Villo et al. | 411/167 |
| 4,061,367 | 12/1977 | Moebius | 29/520 X |

Primary Examiner—Charlie T. Moon
Attorney, Agent, or Firm—Christie, Parker & Hale

[57] ABSTRACT

A collar threads onto a shear pin. When the collar engages a surface of a workpiece, resistance to further threading increases. When sufficient resistance to threading occurs, a setting driver upsets lobes of the collar and forces these lobes radially inward toward the axis of the collar. Material of the collar inside the lobes responds to deformation of the lobes and flows radially inward against the shear pin to lock the collar, shear pin and workpiece together. The driver then rotates freely and a joint has been made with a predetermined clamp-up load and its component parts locked together.

6 Claims, 12 Drawing Figures

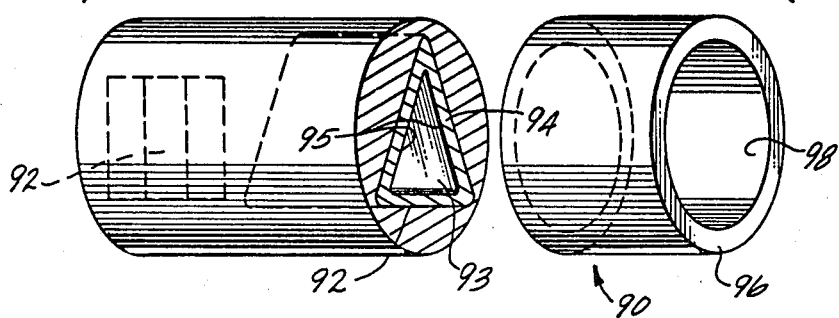
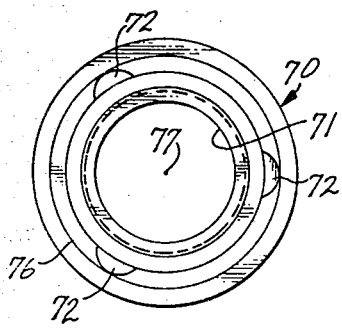
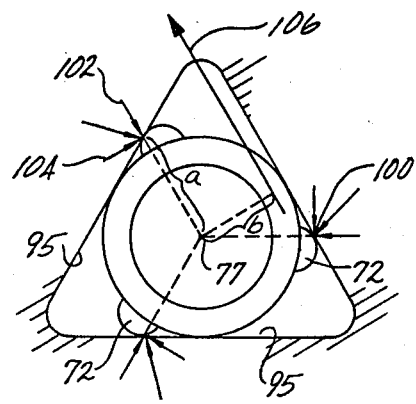
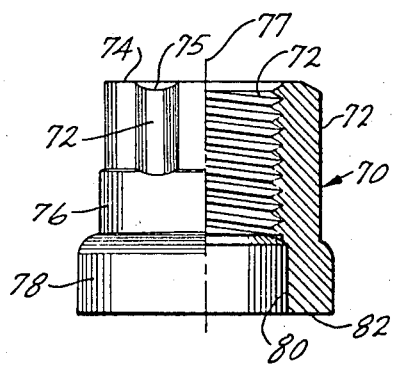

PROCESS OF FORMING A JOINT WITH A PREDETERMINED CLAMP-UP LOAD

This is a division of application Ser. No. 849,756, filed Nov. 9, 1977 now U.S. Pat. No. 4,260,005 issued Apr. 7, 1981.

BACKGROUND OF THE INVENTION

The present invention relates to fasteners in general, and, more in particular, to fasteners that lock when set and that develop a predetermined clamp-up load while being set.

The venerable threaded fasteners consist of a nut and a bolt. The nut has internal threads that thread onto external threads of the bolt. Wrenching surfaces of the nut and bolt accept wrenches that tightly join the fasteners and one or more workpieces together. Broadly, another name for a bolt is a threaded pin, and another name for a nut is a collar.

Many environments in which fasteners are used require that the fasteners have extremely high integrity and strength. Fasteners must bear loads not only along their longitudinal axis but radially of the axis. More particularly, when fasteners join together two or more sheets and the sheets are loaded in their planes with different loads, one sheet tends to slide over the other. Fasteners passing through both sheets become loaded in shear during their resistance to this type of loading. Axial loads arise by the clamping of fastened sheets between a head of the pin on one side of the sheets and the collar on the other side of the sheets.

Fasteners quite often must respond well in environments where they are cyclically stressed under conditions that could give rise to fatigue failure. A fastener with adequate clamp-up load on it tends to resist fatigue failure.

An obviously desirable feature of a fastener is that it does not come apart in service. Various devices have been used to keep a collar and a pin together. One way of locking the collar and pin is to deform the threads of the collar so that they bear in radial compression against the threads of the pin. The resistance to unthreading is purely frictional. The threads are commonly deformed at the factory in preference to the field, but field deformation has also been practiced.

It is also highly desirable to know just what clamping load the fastener applies to a structure. Clamp-up load correlates to the resistance of a collar to further threading onto a pin. As clamp-up force increases, the resistance to further threading increases and the torque required to turn the collar increases. This fact has been used in fasteners to develop a predetermined clamp-up load. In one prior art fastener, a wrenching section connects to a collar by a frangible breakneck that breaks upon the application of a predetermined torque that corresponds to the desired clamp-up load.

The features of a thread lock and a collar with a frangible breakneck for clamp-up load control have been combined in one collar. Regrettably, the combination has its shortcomings. A thread lock by deforming threads of the collar is effected at the factory. As such, the collar does not freely thread onto the shear pin. This makes setting somewhat difficult. Protective and lubricating coatings applied to the threads of the collar can be worn off in a collar having this type of thread lock by the considerable frictional drag between the threads of the collar and pin. The fact that a wrenching section separates from a threaded section of the collar creates a spare piece of the wrenching section that must be removed from the environment where the fastener is set. This is a nuisance. Where corrosion control is important, a circular band of bare material on the collar is created by failure of the breakneck. This band is not protected by corrosion inhibitors applied to the fastener when it was manufactured. This type of fastener is also comparatively expensive because it requires considerable machining in its formation. The frangible breckneck section must be of very close dimensional tolerance if reasonably close tolerances in breakoff torques are to exist. This problem is compounded by machine tool wear in the tools that make the part and also because the breakneck section becomes elliptical-shaped after the thread locking feature has been incorporated. Alternative methods of forming the frangible breakneck, such as roll forming, are not available because the part is hollow. The frictional drag between the shear pin and the collar in a fastener system employing a preexisting deformed thread lock results in a broad range in clamp-up force because the drag varies between large limits and is an important component in the resistance that effects failure of the frangible breakneck.

A second approach to a locking fastener system employs a pin that has an outer annular groove placed to be outside but near to one side of the structure being fastened. A collar is deformed radially inward into the groove so that collar material is restrained axially by radial walls of the groove. A condition of axial interference exists. In one type of such fastener a female threaded member threads onto a male threaded member with one setting tool. A second setting tool radially deforms the female member into the threads of the male threaded member.

SUMMARY OF THE INVENTION

The present invention provides a unique locking collar, fastener system comprised of a locking collar and a pin, and a process for use of the system.

The invention contemplates a locking collar having internal threads for receipt on male threads of a pin. The collar has at least one external lobe or rib. A driver bears against the lobe with a radial component of force, a component of force in the direction of the axis of the collar. When the resistance to rotation of the collar increases to a predetermined level after the collar engages the surface of a workpiece being fastened, the lobe yields in radial compression and displaces collar material radially inward of the lobe into locking engagement with the pin.

In a presently preferred embodiment of the present invention, the collar has an internally threaded, right cylindrical bore for cooperation with external threads of a pin. The pin can have a manufactured head or it can be a stud. A plurality of axially extending lobes on the outside of the collar and radially outward of the collar threads are the lobes that fail in radial compression. Preferably, the lobes are regularly spaced about a circle on the outside of the collar. A driver has flats that bear against these lobes to thread the collar onto the pin, and then to fail the lobes in radial compression and displace material of the collar radially inward of the lobes against the pin. The geometrical relationship between the surface of the lobes and the flats is the same for each lobe and flat so that each lobe and its backing material radially inside of it yield at the same applied torque. Void cavities or volumes on the shear pin index with the inside wall of the collar where material will protrude radially inward so that displaced material of the collar flows into the void spaces. The void volumes in this preferred embodiment result from axially extending flats. The spaces for deformed collar material are radially inward of the maximum radius of the flats so that after deformation the collar and the pin are secured together by rotational interference of collar material and shear pin material. The threads of the collar and pin are of sufficient axial extent outside the zone influenced by the lobes to provide axial interference between the threads in a standard manner. As is the case in conventional practice, means is provided to keep the shear pin from rotating with respect to structure and the collar during setting. These means may be a circular recess in the threaded end of the pin, for example a recess with a hexagonal array of wrenching flats for a cooperating wrenching tool. In the case when the pin is a stud, the stud may be installed and tightened on the workpiece before the collar is threaded onto it. Because the fastener is torque sensitive, it is preferred to have all lobes concentric to the threads and of the same surface geometry. When the surfaces of the driver that engage the lobes each has the same geometry, failure of each lobe will occur at the same applied torque. A convenient lobe array is three lobes of equal radius from the axial centerline of the collar's threads. Each lobe has a convex curvature in radial planes and the curvatures of the lobes are equal to each other. To make it easy to install a driver, it is also preferred that the lobes be situated equal angular distances from each other for example, 120° apart.

Preferably, the collar has a comparatively large bearing end to distribute clamp-up load on the workpiece and reduce unit loading on the workpiece. To guide the driver over the lobes, the lobes preferably are beveled at their tops. To pilot the driver in rotation, the collar preferably has a right cylindrical section just below the lobes for cooperating with a similar right cylindrical section of the driver. The void volumes or cavities of the pin preferably are formed by an array of hexagonal, longitudinally extending flats. The fastener components can have any desired corrosion inhibiting surface treatment or lubrication. For example, the fasteners can be cadmium plated and can have a lubricant of cetyl alcohol on their threads.

The present invention provides, among other advantages, an inexpensive, self-locking, load determining fastener system, that sets easily, provides a very effective rotational lock, and can have surface treatment that is not affected by rotational lock or load detemining functions. The collar threads freely onto the threads of the pin until the collar engages the workpiece. Thereupon resistance builds up until the lobes fail in radial compression. Failure occurs in but a few degrees of arc and therefore the amount of clamp-up load on the structure being fastened is determined accurately within close limits. With the failure of the lobes, the setting driver turns freely on the collar indicating that the fastener system is set. Load deformation is without throwaway pieces. Corrosion inhibitors and lubricants are not affected by this deformation. The fastener can be made inexpensively, in contrast to fasteners that require close tolerances at a breakneck.

These and other features, aspects and advantages of the present invention will become more aparent from the following description, appended claims and drawings.

BRIEF DESCRIPTION OF THE FIGURES

FIG. 9 illustrates in top plan view the preferred form of the collar of the present invention;

FIG. 10 illustrates in elevational view, partly in half section, the preferred collar of FIG. 9;

FIG. 11 illustrates in perspective a suitable driver for the collar of FIGS. 9 and 10; and FIG. 12 illustrates vectorially the correlation between applied torque and clamp-up load.

DESCRIPTION OF THE PREFERRED EMBODIMENTS

Figure 1:
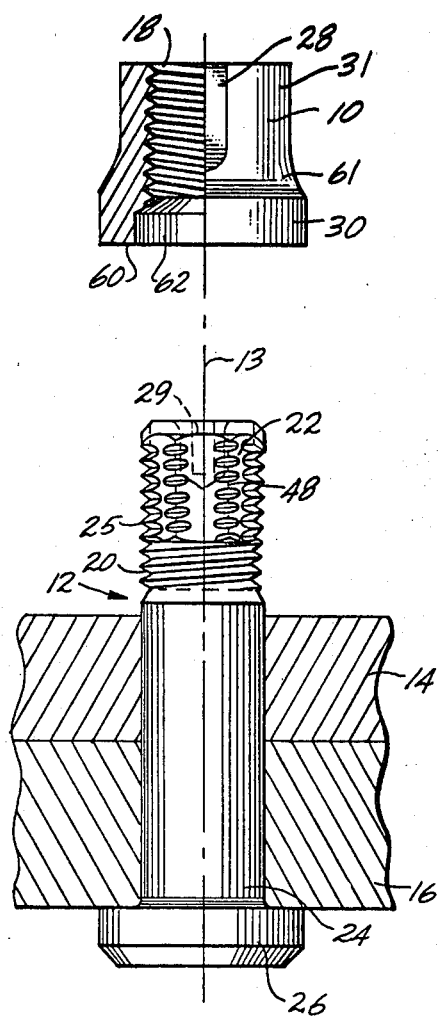
FIG. 1 is an expanded, elevational view of the collar and shear pin of the present invention, with the collar being shown partly in half section and the pin being shown in a pair of sheets.
Figure 2:
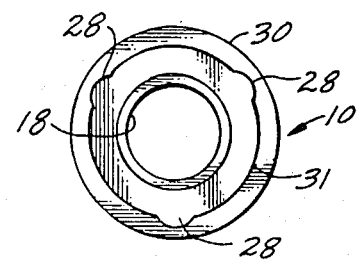
FIG. 2 is a top plan view of the collar of FIG. 1.

FIG. 1 shows a locking collar 10 and a shear pin 12 which together form a fastening system. The collar and pin have a common axis 13. A pair of sheets 14 and 16 receive the shear pin. The collar has an internally threaded bore 18. Bore 18 is circular and the threads are not deformed to form a thread lock. Thus the threads project onto planes radial to axis 13 as congruent circular rings—and not elliptical rings. The shear pin has male threads 20 at one end of the pin. These threads receive the threads of the locking collar. The threads are rolled over hexagonal flats 22 of the pin. As will be developed, these flats define void volumes or cavities for receipt of material of the locking collar. The pin has an unthreaded shank 24 received in aligned holes in workpieces in the form of sheets 14 and 16. A manufactured head 26 of the pin bears on an exposed surface of sheet 16 to develop axial clamp-up load on the sheets in cooperation with locking collar 10. Flats 22 extend an axial distance along the pin. The threads are not fully developed on the flats, as indicated at 25. The threads below the flats and above shank 24 are fully developed and are indicated by reference numeral 27. The shear pin has a wrenching recess 29 on its threaded end.

The locking collar has a plurality of external, axially extending ribs or lobes 28. In plan view these lobes are regularly spaced apart in a circular array. Specifically, the lobes are spaced angularly from each other an equal amount. The lobes in radial planes with respect to axis 13 have convex outward, circular curvature. The radius of curvatures of all the lobes are equal. The lobes extend purely axially. An axial wall 31 of the collar between lobes is right cylindrically curved with a center of curvature on axis 13.

A base or foot 30 of the collar has a diameter larger than the balance of the collar in order to reduce unit loading on the sheets.

With this brief description in mind, a brief description of the operation of the fastener system of the invention will aid in understanding the structural requirements of the system. The operation description will be presented with reference to FIGS 4 through 8.

Figure 4:
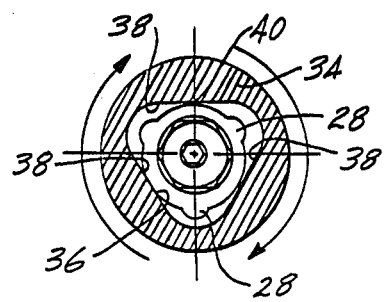
FIG. 4 shows a driver inserted over the collar of the previous figures for threading onto the threads of the shear pin.
Figure 6:
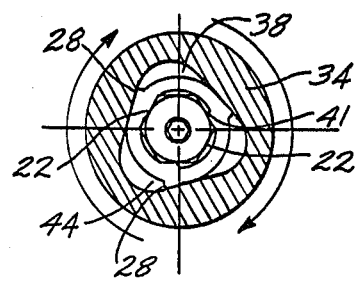
FIG. 6 illustrates the collar and shear pin of the previous figures as lobes of the collar begin to fail under the force of the driver and collar material radially inward of the lobes begins to flow into void volumes defined between the shear pin and the collar.
Figure 5:
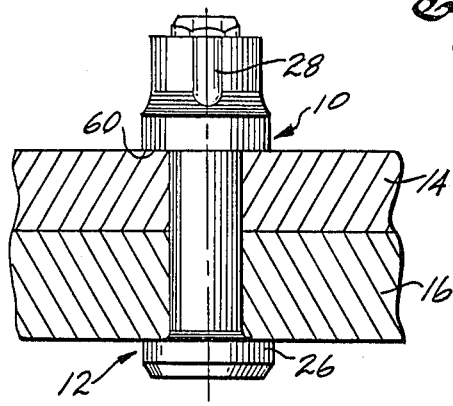
FIG. 5 shows the collar and shear pin of the previous figures clamping a pair of sheets, but before the design clamp-up load has been reached.

In FIGS. 4 and 6 a driver 34 has a deltoid socket 36 with three flat sides 38. These sides approach the center of the driver, which correspond to axis 13 of the fastener system, at a point of minimum radius, such as shown at 40. On either side of these points the radius to the sides increases from the center. The point of minimum radius approaches the radius of the collar between the lobes. Lobes 28 are engaged by the sides of the driver. The action of the driver on the lobes as the driver is rotated clockwise threads the collar down on threads 20 of the shear pin. The driver does not deform the lobes at this time because the resistance to rotation during this phase of making a joint is slight. FIG. 5 shows the fastener system as it appears with the collar abutting one side of the pair of sheets and the head of the shear pin abutting the other side. With continued rotation of the driver, resistance to rotation increases. As can be seen in FIG. 6 the driver sides engage the lobes and produce both radial and tangential components of force on the lobes, with these directions being taken with respect to the axis of the fastener system. The radial component of force begins to flatten the lobes into the body of the collar. The material thus displaced pushes material on the inside of the collar into void spaces defined between the flats of the shear pin and the collar. In FIG. 6, the displaced material on the inside of the collar is shown by reference numberal 44 protruding into what was formerly a cylindrical bore. Geometrical considerations attending deformation will be described subsequently with reference to FIG. 12.

Figure 7:
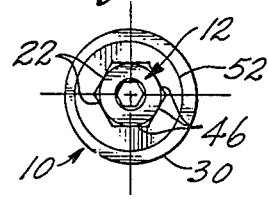
FIG. 7 illustrates the collar and shear pin of the previous figures in top plan view after the lobes have failed and the void volumes have been filled with collar material.
Figure 8:
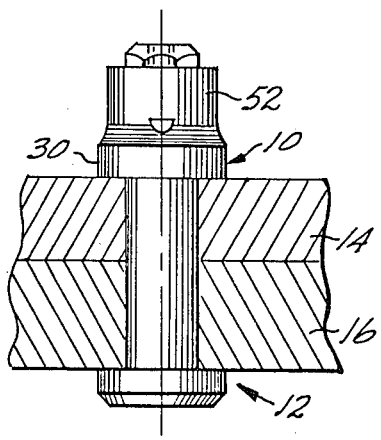
FIG. 8 shows a joint effected by the collar and shear pin of the previous figures and sheets after the lobes have been displaced into the body of the collar and collar material forced into the voids.

With reference to FIGS. 7 and 8, after the driver completely erases the lobes, it is free to turn on the collar and an operator knows that a joint has been effected. The void volumes existing previously between the collar and the flats now are substantially completely filled with displaced collar material and the inside of the collar takes on a hexagonal configuration in conformance with the hexagonal configuration of the pin flats. This is shown by reference numeral 46 in FIG. 7. A rotational lock now exists. The fastener cannot be unthreaded. Furthermore, the wrenching means has dissappeared with the formation of this rotational lock. Because the ribs or lobes deform and dissappear within a few degrees of rotation of the driver, corresponding to the angle subtended by each lobe, axial clamp-up is never an independent function of the resistance of the collar to rotation on the pin and clamp-up can be accurately controlled and predicted. Stated differently, resistance to rotation of the collar is a function of the axial load applied by the sheets onto the collar. This loading loads the flanks of the threads between the collar and the pin. As the load on the flanks increases, so does the frictional resistance to turning. Eventually the resistance to turning exceeds the yield strength of the lobes and the fastener is set. As distinguished from thread locks with predetermined threads, removal of the axial load removes the frictional drag on the flanks of the threads. In this connection because rotational lock-up is not effected until displacement of collar material into the void volumes, the collar can freely thread onto the threads of the pin without meaningful resistance. This means that setting is easier and any lubricant or corrosion protection on the threads will not be worn away by friction. Threading and lock-up are all effected by a single tool.

Figure 3:
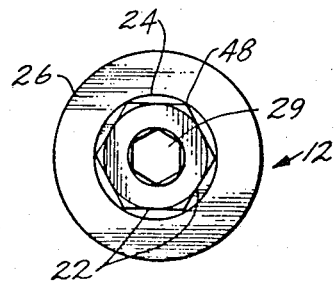
FIG. 3 is a top plan view of the end of the shear pin of FIG. 1 that receives the collar.

With reference again to the first three figures, pin flats 22 can be produced by extrusion and are of sufficient length along the axis of the fastener to accommodate desired grip variation. Grip is the thickness of the sheets that can be fastened by the fastener. The flats and the cooperating circular axial bore of the locking collar clearly illustrate the cavities or void volumes. The radius to the edge between adjacent flats, the edge being shown in FIGS. 1 and 3 by reference numeral 48, is greater than the radius to any other point on each of the flats. This radius is representative of the radius to material of the locking collar. Thus the void volumes in this embodiment can be viewed as the area outside of the chord of a circle to the arc of the circle subtended by the chord. In aggregate, the void volumes are represented by the areas outside of a hexagon and within a circumscribing circle. The third dimension of the volumes is axially along the lengths of the flats. Obviously, there must be sufficient volume to accept all of the displaced rib or lobe material so that the rib will completely deform and merge into the body of the collar and leave a completely right cylindrical outside surface of the collar upon the setting of a joint. (Such a surface is shown in FIGS. 7 and 8 by reference numeral 52. This right circular configuration represents the curvature of the surface of the collar between the lobes before lobe failure.)

The void volumes can be defined by other configurations. It is only necessary that the lobes register with the volumes when the ultimate strength of the lobes has been reached. With the hexagonal form, registration is always assured even if the lobes are on the same radius as the edge of the flats, for the lobes will then be displaced into two volumes. The hexagonal form, and other forms that meet the collar threads only along lines or edges, avoids any possibility of having material from the collar unable to flow freely into void volumes because of a failure to index. Again, it is only necessary to provide sufficient volume for the acceptance of all the displaced lobe material. For this material to act effectively as a rotational lock it should be radially within the confines of the locking collar. Any material that escapes out of the top of the collar will not be as effective as material within the collar. The void volume should be sufficient to accommodate differences in grip. At maximum grip the collar will end up further away from the manufactured head of the shear pin than at minimum grip. Void volume should be adequate for both extremes.

Examples of void volumes provided by other structures includes splines on the surface of the shear pin. The interstices between the crests of the splines and the axial length of the splines and radially inside the collar threads provide the volumes. Indeed, it is not necessary to have a void volume at all in the sense of developing positive axial rotational interference. The space between the threads of the collar and the standard threaded shear pin will provide a volume for the displacement of lobe material and a friction type thread lock. The advantage of rib disappearance can be forborne so that not even this space would be required to be of adequate volume to accept a volume corresponding to the volume of the lobes. This will mean of course that the lobe will still be in place for purchase of a wrenching tool and there will not be a positive indication of when the predetermined clamp-up load has been reached.

The number of lobes on the locking collar need not be the three illustrated. The relationship between the number of lobes and the number of flats illustrated need not be followed either. In the illustrated embodiments, there are three lobes to six flats. This relationship can be varied. In some applications it may be desirable to increase the number of lobes while effecting the same amount of interference with the shear pin in order that less collar material for each lobe be displaced.

The number of lobes need not correspond to the number of flats of the driver. In the illustrated embodiments the driver has three flats for the three lobes of the locking collar. A greater number of collar lobes than forming tool flats results in a progressive deformation of the collar in the zone of the lobes and a lower setting torque requirement of the tool that drives the driver. It also reduces the clamp-up load on the sheets over what such load would be when the greater number of lobes are failed simultaneously.

The particular driver configuration can also change. The three flats shown could be replaced by just a single flat so that there would be a progression of steps in lobe deformation.

The relationship between the driver flats and lobes during the development of the lock should be one that produces radial failure of the collar in the zone of the ribs or lobes, and not shearing of the ribs from the collar. The ribs would shear from the collar with a sufficient tangential component of force. There must be some shear component on the lobes. Obviously the required relationships exist when the loading of the collar is dominantly radially inward, and not tangential. The cross section surface of the ribs as continuous convex curves, as shown, is not critical. The ribs cold have a surface which is wedge-shaped in cross section, for example.

The collar can be formed of a work hardenable material. This has the attraction of increasing the strength of the collar where it interferes with the shear pin as a joint is being made, instead of at some earlier time.

Completing the details of the description of the first embodiment, the collar has a foot 30 that presents an annular bearing surface 60 to a sheet. The surface area available for bearing is comparatively large and the unit loading on the sheet comparatively small. The foot is right cylindrical. A transition section 61 flares smoothly into right cylindrical surface 31 from the foot. An axial counterbore 62 within this foot provides space for a seal, for example. It also provides a pilot to the threads and allows for grip variation. The collar can be made of any number of materials. One example is 2024 aluminum. The collar can have a thread lubricant. Examples are cetyl alcohol, solid film lubricant, and lauric acid lubricant. The surface of the aluminum can be conditioned, as by anodizing. The part can be heat treated.

The shear pin can have a manufactured head of any number of standard configurations. It can also be a stud. For example, the manufactured head need not be protruding but can be of the type that recesses into a counterbore in sheet 16. The shank diameter need not be the same as the major thread diameter. In the illustrated embodiment, a non-circular wrenching recess 29 accepts a wrenching tool. The wrenching tool prevents rotation of the shear pin during setting of the locking collar. Obviously other means can be provided to prevent the shear pin from rotating. For example, the manufactured head can have wrenching flats. The shear pin can be made in different materials, for example, alloy steel. The part can have a lubricant plate, as in the collar. The part can have a protective coating, such as cadmium plate or an aluminum coating.

With reference to FIGS. 9 and 10, the preferred form of the locking collar is shown by reference to numeral 70. As before, this collar has an internally threaded, right cylindrical bore 71. There is no preformed thread lock. Three axially extending ribs or lobes 72 extend from an upper end of the collar to a pilot surface 76. An axially extending, exterior surface 74 between lobes is right cylindrically curved. The lobes are beveled at 75 at their tops to facilitate receipt of a driver. Pilot surface 76 is right cylindrical and it has a diameter corresponding to a right cylindrical female surface of a driver. It will be noted that the radius of the pilot surface corresponds to the maximum radius of each of the lobes. The pilot surface and the beveled lobe tops are the structure that makes this embodiment preferred. Except for the lobes, the collar constituents are concentric on a common axis 77. The lobes are again bounded on their outside by circularly curved surfaces, as viewed in planes radial of axis 77. All the lobes have equal curvatures on their outside surfaces. The radii to corresponding points on the surfaces of all the lobes from axis 77 are the same.

As before, a foot 78 of the collar is counterbored at 80 and is a substantially right cylindrical section. A bearing surface 82 at the base of the foot is to abut the surface of a workpiece, say a sheet.

It will be noted that the amount of lobe material that must be displaced in FIGS. 9 and 10 embodiments is slightly less than in the earlier embodiment.

FIG. 11 illustrates a driver 90 suitable for driving the locking collar of FIGS. 9 and 10. The driver is generally cylindrical on its outside and has a standard driving socket 92, square in cross section, for accepting a driving lug of a tool. A detailed form socket 93 of the previously described tool has been preserved and thus the three lobes of the collar are deformed at the same time. In radial cross section, this deltoid socket traces an equilateral triangle with rounded corners. The socket has an insert 94 that defines the bearing surfaces for bearing against the lobes. This insert can be made of a material with good wear characteristics. The insert can be made removable and replaced by a second insert for setting a locking collar having lobes of different radii. Sides 95 of insert 94 do the actual bearing on the lobes. A nose 96 of the driver has a right cylindrical bore 98 corresponding in diameter to the diameter of pilot section 76 or foot 78. The bore fits over the pilot section.

The considerations that go into the locking collar of FIGS. 9 and 10 which have not been explicitly set forth here have been set forth with reference to the embodiment of the invention that was first described.

FIG. 12 illustrates the relationship between the driver geometry and the lobe geometry that correlates with torsional resistance to tightening and failure of the lobes and material of the collar radially inward of the lobes. In the Figure, the illustrated collar corresponds to the collar of FIGS. 9 and 10. As such, each of lobes 72 has a circular curvatures in radial planes. The driver is of deltoid form as illustrated in FIG. 11. The closest distance from axis 77 of the collar to each of sides 95 of the driver is equal to the radius of the collar at right cylindrical surface 74, the surface angularly adjacent to the lobes. Given the constraints of the deltoid form driver that has a closest distance to the axis of the collar corresponding to the radius of the cylindrical outside surface of the collar angularly adjacent to the lobes, the circular (in radial planes) curvature of the lobes, and the radius of curvature of the lobes, an initial point of contact 100 on each lobe by each driver side 95 results. This initial point of contact is at a distance "a" from axis 77. As the driver rotates the collar, it will engage the collar at 3 points on the lobes, each point corresponding to point 100. The collar will apply a force along the radius of curvature of the lobe, which is not a radius from axis 77. This force can be broken into components acting radially of the axis of the fastener and tangentially thereto, as shown by vectors 102 and 104, respectively. The total tangential load on the collar is three times the tangential load on a single lobe. This load is resisted by the frictional force between the threads of the collar and the threads of the pin, and the frictional force between the bearing surface at the foot of the collar and the workpiece. As will be recalled, the frictional force between the threads is a direct function of the clamp-up load on the workpieces. The aggregate or total force resisting rotation of the collar is shown by a vector 106 and it acts through a distance "b". As vector 106 increases in magnitude, so must the tangential load on the lobes. The radial load on the lobes, however, bears a fixed relationship to the tangential force on the lobes, as determined by the geometry of the loading, until the lobes begin to yield. Thus, as the tangential loads increase, the radial loads increase, in direct proportion. Since the tangential loads are directly related to the loads resisting rotation by the requirement that the sum of the moments about axis 77 must be zero, the radial loads also are directly related to the resisting loads.

When there is yielding of the lobes, the geometry of the contact between the lobes and the driver changes. The lobes tend to flatten and the driver tends to rotate clockwise (as viewed in FIG. 12) with respect to the lobes. This increase is in the radial loads, but the tangential loads stay the same. Yielding will occur primarily radially but there will be some tangential yielding. It all occurs rapidly and in only a few degrees of arc, as previously discussed.

For predictability of results the lobe geometry and driver geometry should be regular. Preferably the lobe geometry is the same for all lobes and has the same relationship to driver side geometry regardless of which side is presented to which lobe. Obviously the material strength of the material that will yield should be the same in all zones of yielding from the start of yielding to the finish of yielding.

The present invention has been described with reference to certain preferred embodiments. The spirit and scope of the appended claims should not, however, necessarily be limited to the foregoing description.

What is claimed is:

1. A process for forming a joint with a predetermined clamp-up load comprising the steps of:
    (a) inserting an externally threaded end of of a headed pin through a hole in a workpiece of the joint;
    (b) constraining the head of the pin with the workpiece from moving in one direction axially of the pin;
    (c) threading an internally threaded collar onto the threaded end of the pin extending from the workpiece and engaging the workpiece with the collar in opposition to the constraint to load the pin in tension and apply an axially directed clamp-up force onto the workpiece;
    (d) applying with a driver rotated about a longitudinal axis of the collar concentric to its threads a force tangential with respect to the axis of the collar on at least one external lobe of the collar to effect the threading while at the same time applying with the driver a force radial with respect to the longitudinal axis of the collar onto the lobe; the radial force being a direct function of the tangential force, and the tangential force being a direct function of the clamp-up load being applied to the workpiece; and
    (e) plastically yielding the lobe and collar material radially inside the lobe to force such material against the pin thread to rotationally lock the pin and collar together, the plastic yielding being in response to the radial force.

2. The process claimed in claim 1 wherein the collar has a plurality of the lobes, and the tangential and radial forces are applied to each of the lobes by an associated side of a driver in such a manner that the tangential and radial loads on each of the lobes are substantially equal to such loads on each of the other lobes.

3. The process claimed in claim 2 wherein the tangential and radial forces are applied to a first group of at least one of the lobes prior to the application of such loads to a second group of the remaining of the lobes.

4. The process claimed in claim 2 wherein the plastic yielding of the lobe and collar material radially inside the lobe to force such material against the pin includes the forcing of such material into radial pockets of the pin to effect rotational interference between the collar and the pin.

5. The process claimed in claim 4 wherein the force application step merges the lobes into the surface of the collar such that the lobes are eliminated.

6. The process claimed in claim 5 wherein the tangential and radial forces are applied to a first group of at least one of the lobes prior to the application of such loads to a second group of the remaining lobes.

* * * * *

UNITED STATES PATENT AND TRADEMARK OFFICE
CERTIFICATE OF CORRECTION

PATENT NO. : 4,383,353
DATED : May 17, 1983
INVENTOR(S) : Edgar L. Stencel

It is certified that error appears in the above-identified patent and that said Letters Patent are hereby corrected as shown below:

Col. 5, line 55, change "dissappear" to -- disappear --

Col. 5, line 68, change "predetermined" to -- predeformed --

Col. 8, line 44, change "detailed" to -- deltoid --

Col. 8, line 68, change "curvatures" to -- curvature --

Signed and Sealed this

Sixth Day of December 1983

[SEAL]

Attest:

GERALD J. MOSSINGHOFF

Attesting Officer

Commissioner of Patents and Trademarks

REEXAMINATION CERTIFICATE (1727th)
United States Patent [19]
Stencel

[11] B1 4,383,353
[45] Certificate Issued Jun. 30, 1992

[54] PROCESS OF FORMING A JOINT WITH A PREDETERMINED CLAMP-UP LOAD

[75] Inventor: Edgar L. Stencel, Huntington Beach, Calif.

[73] Assignee: VSI Corporation

Reexamination Reqs:st:
  No. 90/002,221, Dec. 6, 1990
  No. 90/002,248, Jan. 4, 1991

Reexamination Certificate for:
  Patent No.: 4,383,353
  Issued: May 17, 1983
  Appl. No.: 205,605
  Filed: Nov. 10, 1980

[51] Int. Cl.⁵ .................. B21D 39/00; B23P 11/00
[52] U.S. Cl. .................. 29/517; 29/525.1; 403/284
[58] Field of Search .......... 29/517, 525.1, 240, 29/520, 446, 437; 411/1, 2, 361, 281, 282, 283; 403/284; 81/121.1

[56] References Cited

U.S. PATENT DOCUMENTS

| | | | |
|---|---|---|---|
| 930,450 | 8/1909 | Zinow | 411/277 |
| 1,172,427 | 2/1916 | Carlson | 411/277 |
| 1,389,927 | 9/1921 | Ball . | |
| 2,596,885 | 5/1952 | Booth | 29/517 X |
| 2,713,882 | 7/1955 | Wilkes | 411/206 X |
| 2,897,867 | 8/1959 | Torre | 411/281 |
| 2,923,339 | 2/1960 | Skidmore | 411/277 |
| 3,464,306 | 9/1969 | Reynolds et al. | 411/361 |
| 3,603,132 | 9/1971 | Holmes | 29/517 X |
| 3,763,725 | 10/1973 | Reiland | 411/2 X |
| 3,792,933 | 2/1974 | Stencel | 403/19 |
| 3,854,372 | 12/1974 | Gutshall | 85/61 |
| 3,865,007 | 2/1975 | Stanback | 411/2 |
| 3,920,338 | 11/1975 | Dahl | 403/284 X |
| 4,005,740 | 2/1977 | Villo et al. | 411/167 |
| 4,061,367 | 12/1977 | Moebius | 29/520 X |
| 4,074,011 | 2/1978 | Terame et al. | |

FOREIGN PATENT DOCUMENTS

| | | |
|---|---|---|
| 222771 | 7/1959 | Australia . |
| 6602955 | 7/1969 | Fed. Rep. of Germany . |
| 1675031 | 12/1970 | Fed. Rep. of Germany . |
| 1750585 | 2/1971 | Fed. Rep. of Germany . |
| 2355189 | 5/1974 | Fed. Rep. of Germany . |
| 34118 | 6/1911 | Sweden ........ 40/ |
| 1049239 | 11/1966 | United Kingdom . |

Primary Examiner—Joseph M. Gorski

[57] ABSTRACT

A collar threads onto a shear pin. When the collar engages a surface of a workpiece, resistance to further threading increases. When sufficient resistance to threading occurs, a setting driver upsets lobes of the collar and forces these lobes radially inward toward the axis of the collar. Material of the collar inside the lobes responds to deformation of the lobes and flows radially inward against the shear pin to lock the collar, shear pin and workpiece together. The driver then rotates freely and a joint has been made with a predetermined clamp-up load and its component parts locked together.

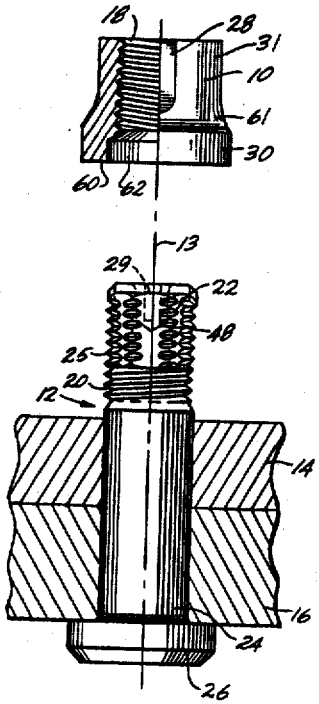

REEXAMINATION CERTIFICATE ISSUED UNDER 35 U.S.C. 307

THE PATENT IS HEREBY AMENDED AS INDICATED BELOW:

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 2 are cancelled.

New claims 7–10 are added and determined to be patentable.

3. [The] *A* process [claimed in claim 2] *for forming a joint with a predetermined clamp-up load comprising the steps of:*
   *(a) inserting an externally threaded end of a headed pin through a hole in a workpiece of the joint;*
   *(b) constraining the head of the pin with the workpiece from moving in one direction axially of the pin;*
   *(c) threading an internally threaded collar onto the threaded end of the pin extending from the workpiece and engaging the workpiece with the collar in opposition to the constraint to load the pin in tension and apply an axially directed clamp-up force onto the workpiece;*
   *(d) applying with a driver rotated about a longitudinal axis of the collar concentric to its threads a force tangential with respect to the axis of the collar on a plurality of external lobes of the collar to effect the threading while at the same time applying with the driver a force radial with respect to the longitudinal axis of the collar onto the lobe; the radial force being a direct function of the tangential force, and the tangential force being a direct function of the clamp-up load being applied to the workpiece; and*
   *(e) plastically yielding the lobe and collar material radially inside the lobe to force such material against the pin thread to rotationally lock the pin and collar together, the plastic yielding being in response to the radial forces; and wherein*
   *the tangential and radial forces are applied to each of the lobes by an associated side of a driver in such a manner that the tangential and radial loads on each of the lobes are substantially equal to such loads on each of the other lobes, and* the tangential and radial forces are applied to a first group of at least one of the lobes prior to the application of such loads to a second group of the remaining of the lobes.

4. The process claimed in claim [2] *14* wherein the plastic yielding of the lobe and collar material radially inside the lobe to force such material against the pin includes the forcing of such material into radial pockets [of] *interrupting* the thread *on* the pin to effect rotational interference between the collar and the pin.

5. The process claimed in claim [4] *14* wherein the force application step merges the lobes into the surface of the collar such that the lobes are eliminated.

6. [The] *A* process [claimed in claim 5] *for forming a joint with a predetermined clamp-up load comprising the steps of:*
   *(a) inserting an externally threaded end of a headed pin through a hole in a workpiece of the joint;*
   *(b) constraining the head of the pin with the workpiece from moving in one direction axially of the pin;*
   *(c) threading an internally threaded collar onto the threaded end of the pin extending from the workpiece and engaging the workpiece with the collar in opposition to the constraint to load the pin in tension and apply an axially directed clamp-up force onto the workpiece;*
   *(d) applying with a driver rotated about a longitudinal axis of the collar concentric to its threads a force tangential with respect to the axis of the collar on a plurality of external lobes of the collar to effect the threading while at the same time applying with the driver a force radial with respect to the longitudinal axis of the collar onto the lobe; the radial force being a direct function of the tangential force, and the tangential force being a direct function of the clamp-up load being applied to the workpiece; and*
   *(e) plastically yielding the lobe and collar material radially inside the lobe to force such material against the pin thread to rotationally lock the pin and collar together, the plastic yielding being in response to the radial force, including the forcing of such material into radial pockets interrupting the thread on the pin to effect rotational interference between the collar and the pin, wherein the force application step merges the lobes into the surface of the collar such that the lobes are eliminated; and* wherein
   the tangential and radial forces are applied to each of the lobes by an associated side of a driver in such a manner that the tangential and radial loads on each of the lobes are substantially equal to such loads on each of the other lobes, and the tangential and radial forces are applied to a first group of at least one of the lobes prior to the application of such loads to a second group of the remaining of the lobes.

*7. A process for forming a joint with a predetermined clamp-up load comprising the steps of:*
   *(a) inserting an externally threaded end of a headed pin through a hole in a workpiece of the joint;*
   *(b) constraining the head of the pin with the workpiece from moving in one direction axially of the pin;*
   *(c) threading an internally threaded collar onto the threaded end of the pin extending from the workpiece and engaging the workpiece with the collar in opposition to the constraint to load the pin in tension and apply an axially directed clamp-up force onto the workpiece;*
   *(d) applying with a driver rotated about a longitudinal axis of the collar concentric to its threads a force tangential with respect to the axis of the collar on at least one external lobe of the collar to effect the threading while at the same time applying with the driver a force radial with respect to the longitudinal axis of the collar onto the lobe; the radial force being a direct function of the tangential force, and the tangential force being a direct function of the clamp-up load being applied to the workpiece; and*
   *(e) plastically yielding the lobe and collar material radially inside the lobe to force such material against the pin thread to rotationally lock the pin and collar together, the plastic yielding being in response to the* radial force, the radial load relative to the tangential load increasing following initial yielding of the lobe.

The process claimed in claim 4 wherein the number of pockets in the pin is greater than the number of lobes collar for displacing material radially inwardly from of the lobes into a void volume.

The process claimed in claim 7 wherein the collar has lobes and the driver has three faces, and the tangential radial forces are applied to each of the lobes by an ited face of the driver in such a manner that the tangential and radial loads on each of the lobes are substantially equal to such loads on each of the other lobes.

10. The process of claim 7 wherein the collar has a plurality of the lobes, and the pin has a plurality of void volumes interrupting a portion of the thread and the number of void volumes in the pin thread is sufficiently larger than the number of lobes on the collar for assuring that material radially inwardly from each of the lobes displaces into a void volume.

* * * * *